United States Patent [19]

Maa

[11] Patent Number: 4,771,805

[45] Date of Patent: Sep. 20, 1988

[54] GATE VALVE

[75] Inventor: Tsorng J. Maa, Houston, Tex.

[73] Assignee: Vetco Gray Inc., Houston, Tex.

[21] Appl. No.: 566,134

[22] PCT Filed: Nov. 16, 1983

[86] PCT No.: PCT/US83/01797

§ 371 Date: Nov. 16, 1983

§ 102(e) Date: Nov. 16, 1983

[87] PCT Pub. No.: WO84/02506

PCT Pub. Date: Jul. 5, 1984

Related U.S. Application Data

[63] Continuation-in-part of Ser. No. 454,571, Dec. 30, 1982, abandoned.

[51] Int. Cl.$^4$ .............................. F16K 25/00; F16K 3/02
[52] U.S. Cl. ................................ 137/454.6; 251/327; 251/328; 277/166; 277/183
[58] Field of Search .................... 137/454.2, 454.6; 251/328; 277/235 R, 235 A, 236, 166 R, 183

[56] References Cited

U.S. PATENT DOCUMENTS

| | | | |
|---|---|---|---|
| 2,173,381 | 9/1939 | Waddell | 137/454.6 |
| 2,997,057 | 8/1961 | Toth | 137/454.2 X |
| 3,000,393 | 9/1961 | Maynard | 137/454.2 |
| 3,006,601 | 10/1961 | Anderson | 251/328 X |
| 3,387,817 | 6/1968 | Seguenot | 251/317 |
| 3,548,875 | 12/1970 | Lagarelli | 137/454.2 X |
| 3,656,501 | 4/1972 | Buchta | 137/454.6 X |
| 3,658,087 | 4/1972 | Nelson | 137/454.6 |
| 3,671,010 | 6/1972 | Scaramucci | 251/317 X |
| 3,698,418 | 10/1972 | Schmitt | 137/454.6 X |
| 3,843,141 | 10/1974 | Kohn | 297/236 X |
| 3,989,285 | 11/1976 | Yancey | 277/245 R X |
| 4,203,608 | 5/1980 | Nicholson | 277/236 X |

Primary Examiner—Martin P. Schwadron
Attorney, Agent, or Firm—Joseph R. Dwyer

[57] ABSTRACT

A gate valve having a metal-to-metal seal between the gate (26) and the seat carrier (20) and a metal-to-metal seal between the seat carrier (20) and the valve body (10) with the seat carrier and valve body having complementary spaced frustoconical surfaces (18,22).

27 Claims, 8 Drawing Sheets

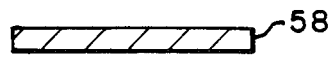
FIG. 8a    FIG. 8b
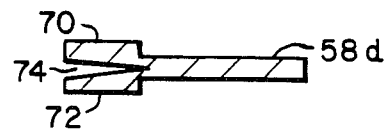
FIG. 8c    FIG. 8d
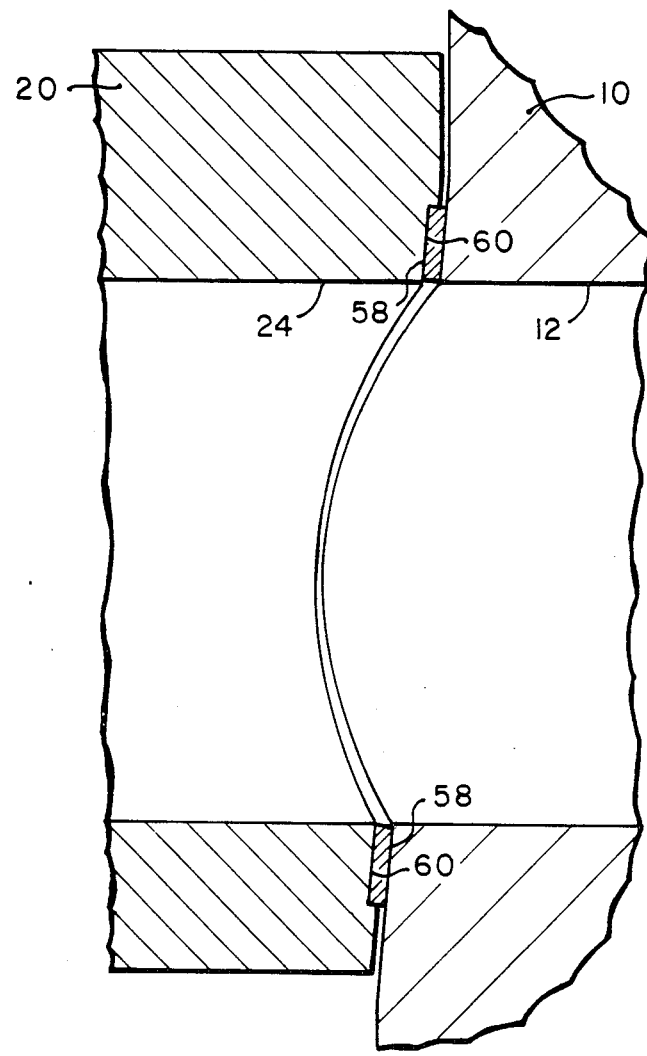
FIG. 9

GATE VALVE

This application is a continuation-in-part of U.S. application Ser. No. 454,571, filed Dec. 20, 1982 by inventor Tsorng Jong Maa and entitled "Gate Valve", now abandoned.

BACKGROUND OF THE INVENTION

In order to minimize maintenance and provide satisfactory operation over extended periods for high pressure valves as well as valves used in particular environments and/or with particular fluids, it is desirable to utilize metal-to-metal sealing rather than an elastomer or the like. It is further desirable that valves operated in high pressures or other severe environments be relatively easy to repair and be of a so-called unitized construction so that the interior parts of the vavle can be removed as a unit for easy replacement and/or repair.

BRIEF DESCRIPTION OF THE INVENTION

The present invention provides a gate valve that utilizes metallic sealing and is of unitized construction. The valve includes a valve body that has the usual through passage for the fluid that is to be controlled and has a bore for receiving the internal portions of the valve with this bore intersecting and traversing the through passage. The portion of the bore adjacent to the through passage is conical and there is received in this conical region a seat carrier. This seat carrier has a through passage in alignment with that of the housing bore. A seal is provided between the seat carrier and the body by means of an annular metallic seal member generally coaxial of these through passages and positioned at each end of the through passage in the seat carrier. The seat carrier is forced into its proper position in the valve body by means of assembling the valve and particularly the bolting down of the valve bonnet. This action squeezes the seal members or, in other words, energizes them into sealing position. When thus energized, the seal members maintain the conical surfaces of the seat carrier and the valve body in spaced relation. The action of forcing the seat carrier into position in the valve body causes compression of the seat carrier (deformation within the elastic limit) and tensioning of the valve body (deformation within the elastic limit) the result of which is to provide a resilient bias urging the seal member into sealing position notwithstanding expansion and contraction of these valve parts due to temperature and pressure variations.

The gate is loosely received within a suitable rectangular recess extending through the seat carrier and a seat arrangement is provided between the gate and the seat carrier so as to provide a metal-to-metal seal through the action of the controlled fluid against the gate.

The valve assembly is such that upon removal of the valve bonnet from the valve body, the entire internal valve assembly is removed as a unit.

BRIEF DESCRIPTION OF THE DRAWINGS

FIG. 8a is a sectional view of the ring taken along line 8—8 of FIG. 6; and

FIGS. 8b, 8c, and 8d are views similar to FIG. 8a by showing modified seal ring constructions.

FIG. 9 is an enlarged fragmentary sectional view of seal ring in position and energized.

DETAILED DESCRIPTION OF THE PREFERRED EMBODIMENT

Figure 1:
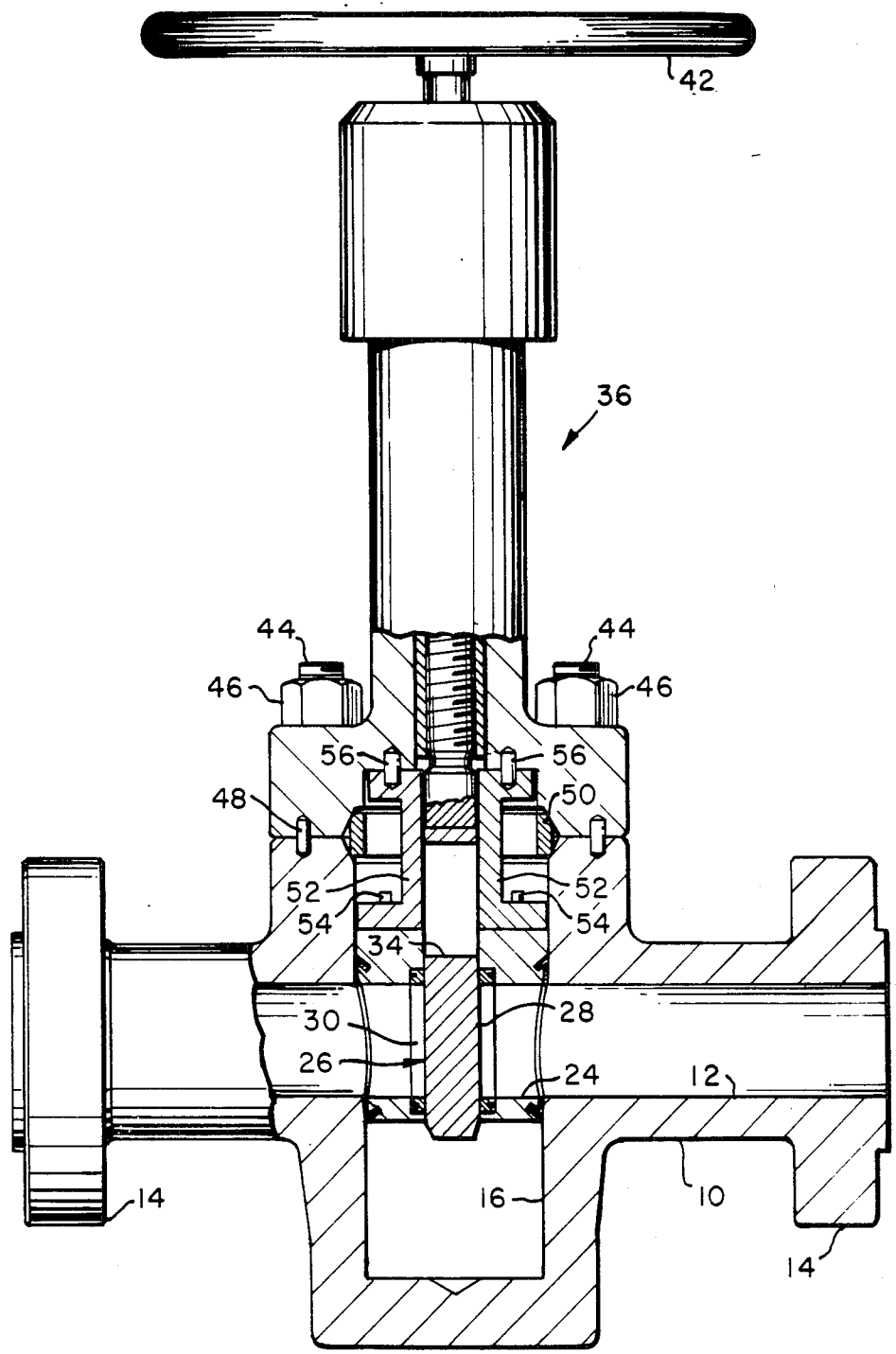
FIG. 1 is a view partially insection of the gate valve of the invention with the gate in the closed position.

Referring to the drawings wherein like reference characters are used throughout the designated like elements, there is disclosed therein a metallic gate valve having a valve body 10 with a through passage 12 therein and the usual flanges 14 for securing the valve within a pipe line or the like through which the passage of fluid is to be controlled. There is provided in body 10 a bore or chamber 16 which is cylindrical at its upper and lower regions as shown but has a conical intermediate portion 18 (FIG. 3).

Received within the conical portion 18 is the seat carrier 20 which has an outer conical surface 22 complementary with the bore portion 18 and spaced therefrom when the seat carrier is properly assembled within the valve body bore 16. Seat carrier 20 has a through passage 24 that aligns with the passage 12 in the valve body.

Figure 2:
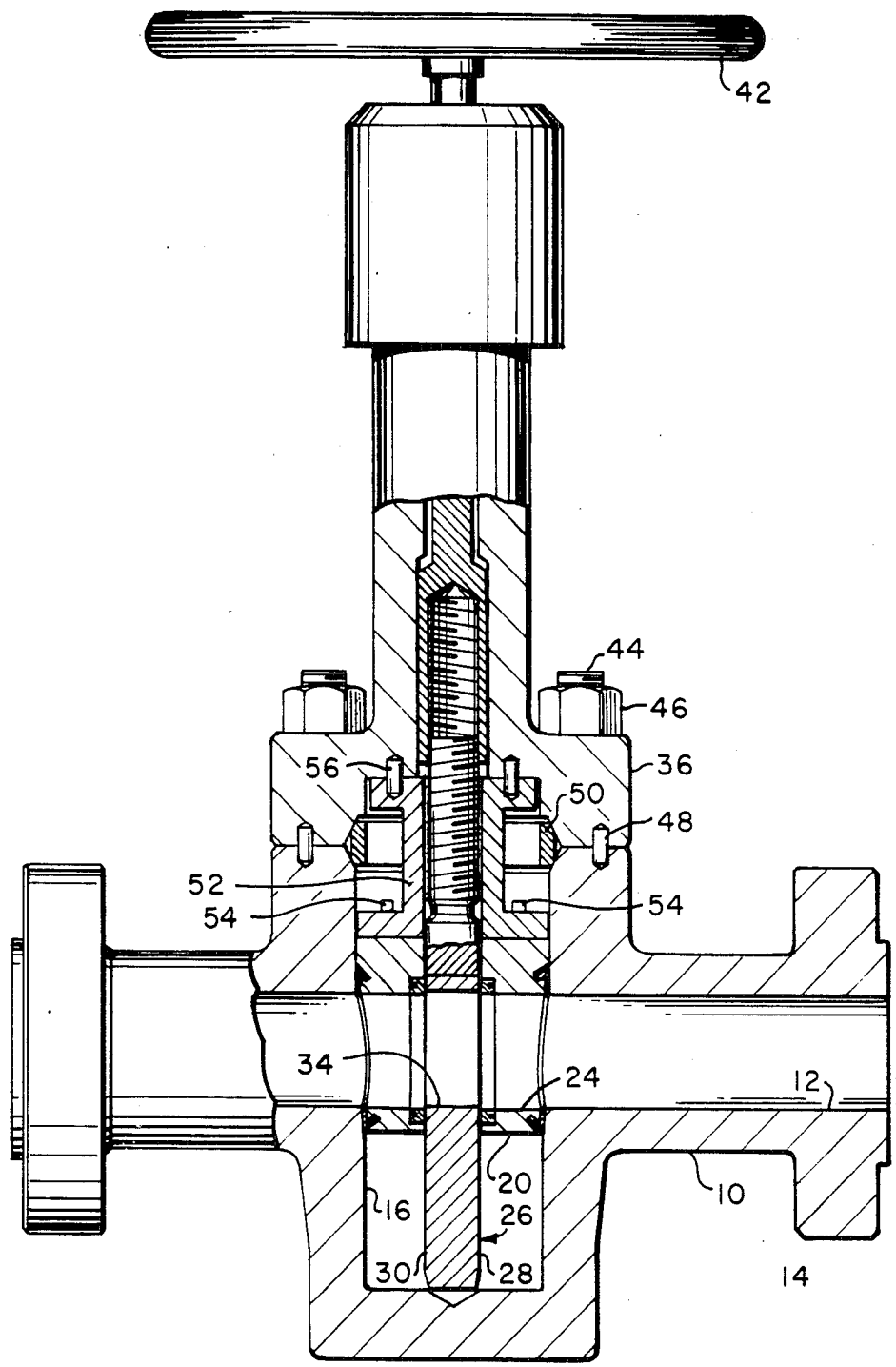
FIG. 2 is a similar view with the gate in the open position.
Figure 3:
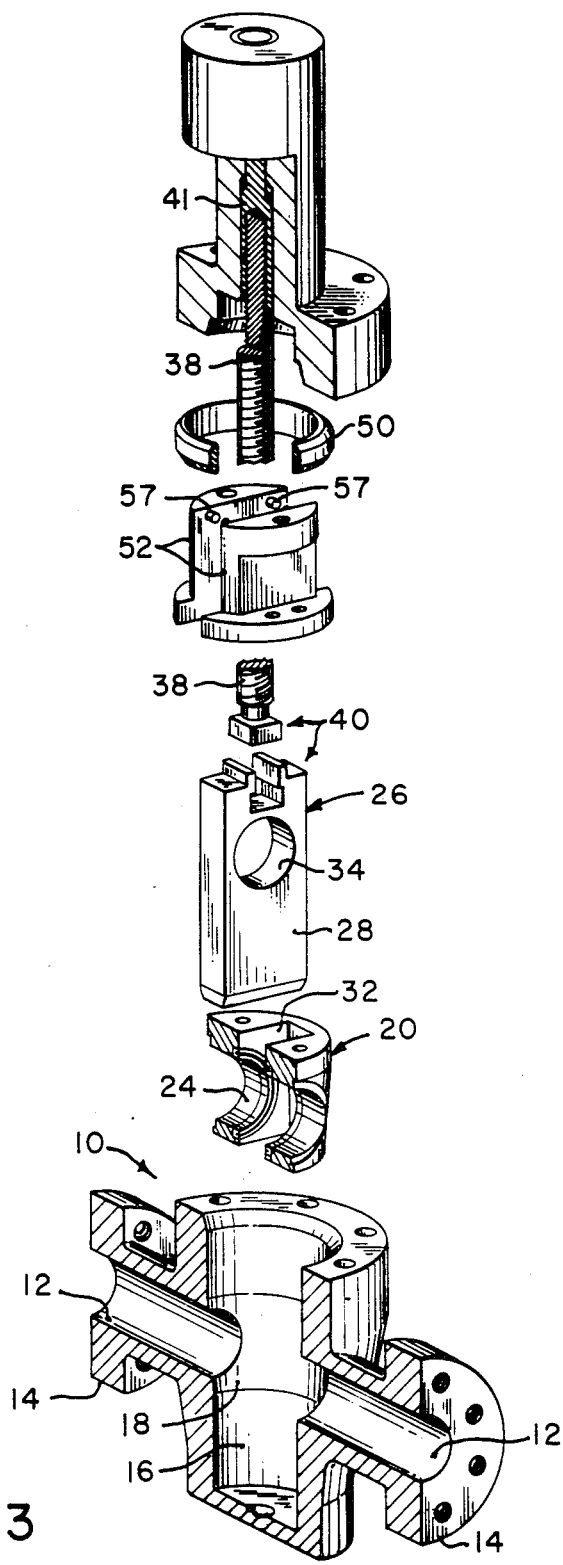
FIG. 3 is an exploded view of the gate valve of the invention.
Figure 4:
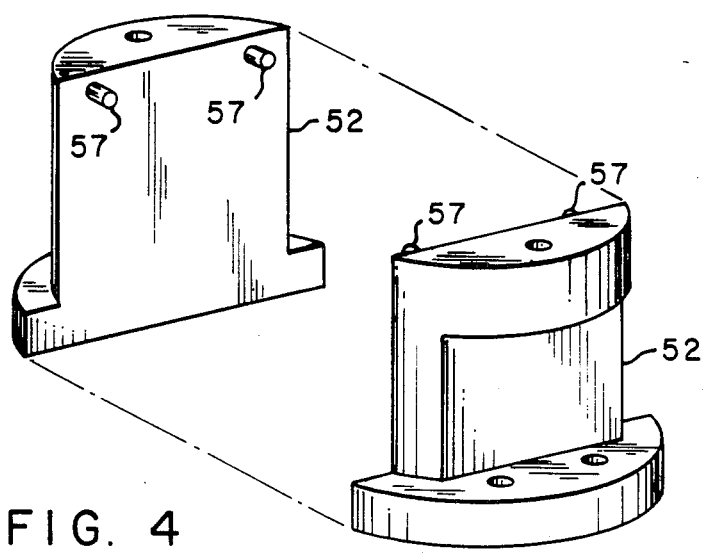
FIG. 4 is a perspective view of the seal loading spacers that form a part of the valve.
Figure 5:
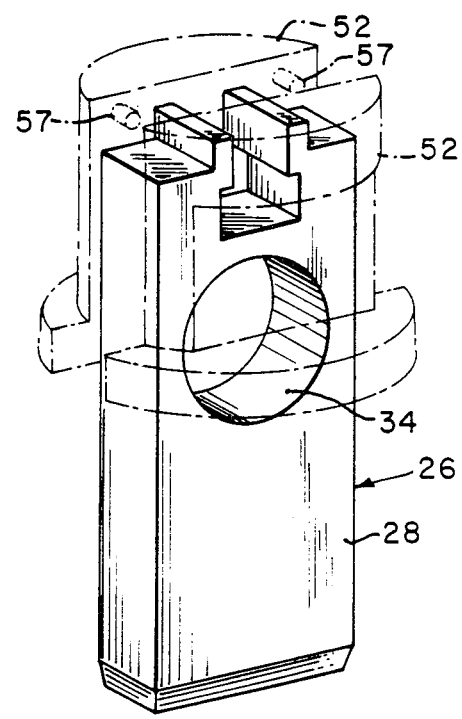
FIG. 5 is a view of the gate with a phanthom view of the spacers as they are positioned relative to the gate in the valve.

The passage of fluid through the valve is controlled by the gate 26, the configuration of which is perhaps best shown in FIG. 3 with the gate being of rectangular configuration and having a pair of opposed flat sealing surfaces 28 and 30. The gate is loosely received in the rectangular recess 32 that extends through the seat carrier 20 with this recess intersecting the through passage 24. The gate is vertically movable, as shown in FIGS. 1 and 2, to and from a closed position (FIG. 1) and an open position (FIG. 2). In the open position, the opening 34 in the gate is in alignment with the through passage 24 thereby permitting free flow of fluid through the valve.

The positioning of the gate 26 is controlled by a suitable mechanism disposed within the valve bonnet 36 and any well-known mechanism for effecting this operation may be employed such as the manually operated non-rising stem mechanism generally depicted in FIGS. 1 and 2 and more fully illustrated and described in U.S. Pat. No. 3,768,774 which is incorporated herein by reference. In the FIGS. 1, 2 and 3 illustrations, threaded stem 38 is loosely connected to the gate 26 by a T-slot type of connection 40. This permits limited relative movement between the gate and the stem. Stem 38 is threaddedly engaged via the internal threads of the upper stem member 41 which is sealed with relation to the upper portion of bonnet 36 by suitable packing (not shown) and is operated by the hand wheel 42.

Bonnet 36 is secured to the valve body 10 by means of the studs 44 which extend through openings in the valve bonnet and have nuts 46 threaded to their upper end for forcing the valve bonnet into position whereby its machined lower surface engages a complementary machine surface on the valve body at the upper end of the bore 16. Proper orientation of the bonnet with relation to the valve body is obtained by the indexing pins 48 and a seal is provided between these two members by means of the ring seal 50.

Interposed between the bonnet 36 and the seat carrier 20 is a loading spacer which comprises two identical spacer members 52, one on each side of the gate 26. These members are secured to the seat carrier 20 by means of bolts 54 and are oriented with relation to the bonnet 36 by means of the pins 56.

The spacers 52 are provided with inwardly projecting pins 57 which are so positioned as to engage the upper end of gate 26 when it is moved to its uppermost position. The purpose of these pins is to provide what is termed a unitized construction in that in assembling and disassembling the valve, the valve internals, i.e. the gate, the seat carrier, the seat loading spacer members, the ring seal and the valve bonnet, are assembled onto and disassembled from the valve body as a unit.

Figure 6:
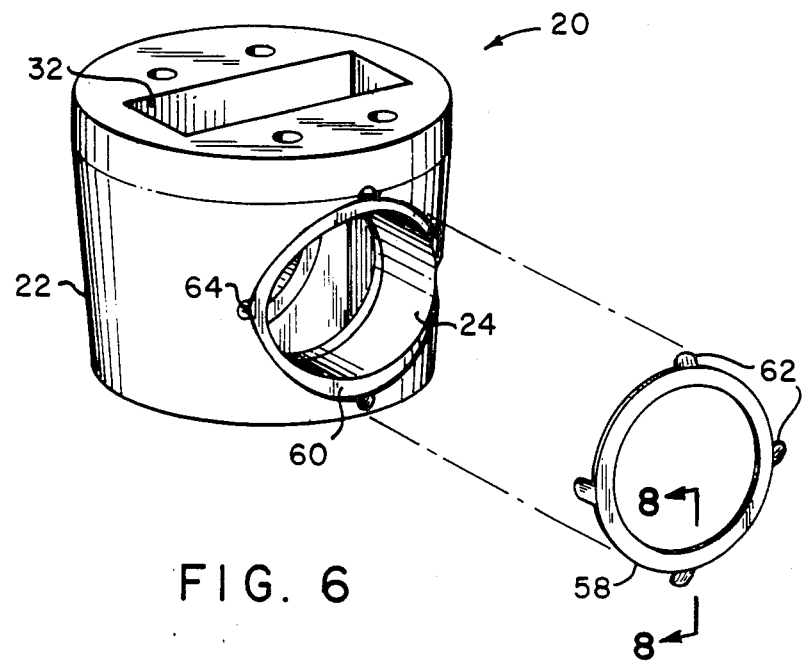
FIG. 6 is a perspective view of the seat carrier and one of the metallic seal rings.
Figure 12:
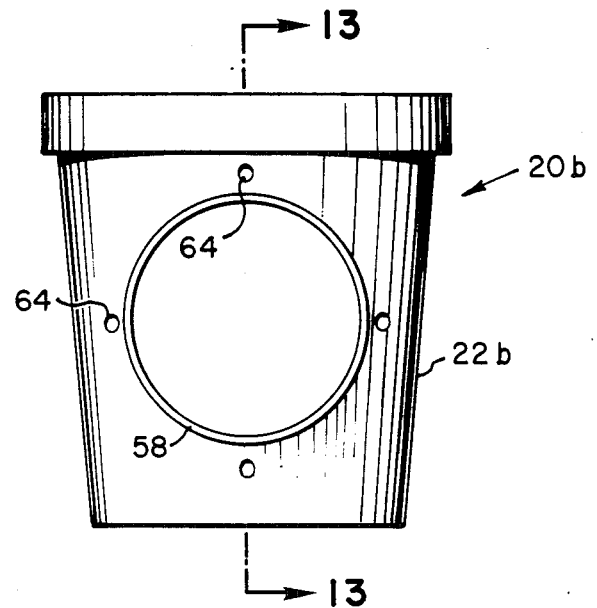
FIG. 12 is an elevational view of still another preferred embodiment of seat carrier having a metallic sleeve insert to prevent inward distortion of the seal ring.
Figure 13:
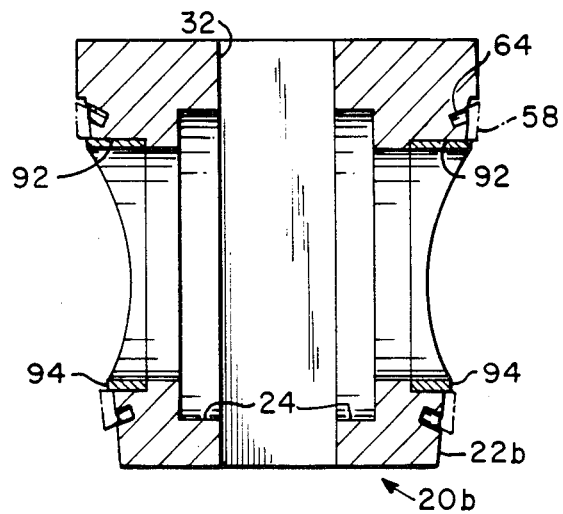
FIG. 13 is a sectional view taken from line 13—13 of FIG. 12.

The seal arrangement between the seat carrier 20 and the valve body 10 is a metallic seal, i.e. a metal-to-metal seal, and for this purpose there is provided in the FIGS. 1–13 embodiments a seal ring 58 which, in the FIGS. 6, 9 and 13 embodiments, is received within an annular recess 60 of uniform depth at the outer end of the through passage 24 on each side of the seat carrier. The ring 58 is secured to the seat carrier so that it is inserted into and withdrawn from the valve body with the seat carrier and for this purpose ears 62 (FIGS. 6 and 13) are provided. These are bent over into complementary bores or recesses 64 formed in the outer surface of the seat carrier 20 and in a manner to positively secure the ring 58 to the seat carrier. The ring 58 is preferably of a metallic material that is ductile and softer than the material of the seat carrier 22 and the material of the valve body 10 and when the valve internals are assembled into position by means of securing the bonnet 36 in place, the seal ring 58 is deformed somewhat (stress exceeding the elastic limit of the material) so that it conforms to any irregularities in the surfaces of the seat carrier 22 and the valve body 12 with which it mates to provide a fluid tight seal. At the same time, the seat carrier is also deformed within its elastic limit, i.e., stressed in compression and the valve body is deformed within its elastic limit, i.e. stressed in tension (elongated and expanded) with the effect being to provide a resilient of spring-like action or bias to give a constant loading on ring 58 notwithstanding differential movement of the valve parts due to pressure and/or temperature variations. It will be appreciated that deformation of the seat carrier will be greater than that of the valve body due to the fact that the latter is considerably more massive than the former.

In other words, the seal is energized or at least partially energized by means of the assembling of the parts into position. It will be appreciated that in assembling the valve, tightening down on the nuts 46 forces seat carrier 20 down into position in bore 16 via valve bonnet 36 and spacers 52 and squeezes the seal rings 58 between the surfaces of bore 19 and the bottom of recess 60 because of the tapered or conical orientation of these surfaces. The thickness of the ring 58 is greater than the depth of the recess or counterbore 60 so that even when the ring has been somewhat deformed into sealing engagement with the seat carrier and the valve housing and the seat carrier is in position with nuts 46 fully tightened, the complementary surfaces of the seat carrier and the valve body are in spaced relation (FIGS. 9, 11, 13 and 15). Among other things, this arrangement permits the force exerted on the seat carrier 22 by the controlled fluid when the gate is in the closed position to further energize or deform the downstream seal ring 58 in high pressure environments and thereby enhance the sealing action. It will be appreciated that in this type of valve the pressure that it seals against when in the closed position is effective to force the gate into sealing engagement with the seat carried by the seat carrier. This pressure is present throughout cavity 16 (the upstream gate seal permitting the sealed against fluid to enter this cavity) so that the downstream seal ring 58 will have developed across it whatever the differential is between the upstream and the downstream pressures.

Illustratively, of the materials of which the valve may be fabricated (and not by way of limitation), the valve body 10 may be AISI 4130 (a low alloy steel), the carrier may be of 17-4 Ph (a precipitation hardening stainless steel) and the seal ring may be of "MONEL Alloy 400", substantially pure nickel or a low carbon steel plated with tin, fluoro plastic or tetra fluoro ethylene.

Figure 10:
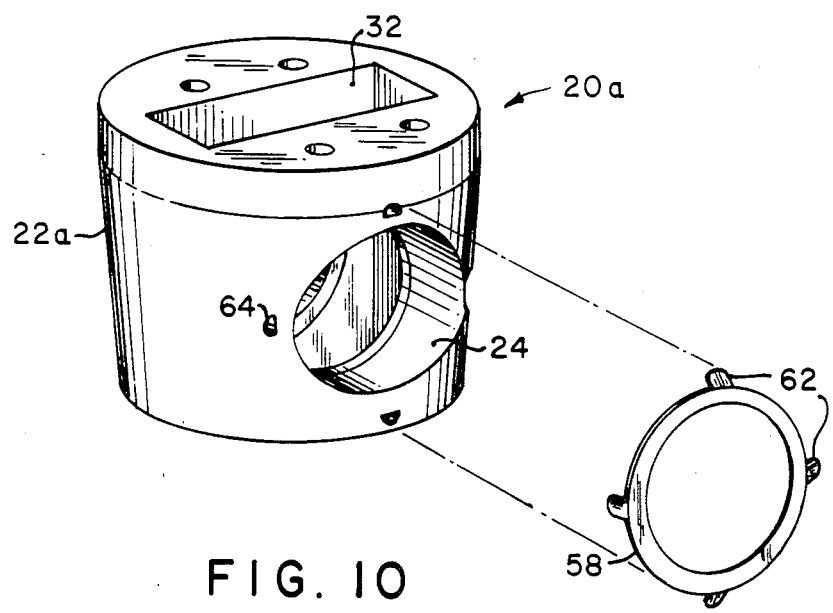
FIG. 10 is a perspective view of another preferred embodiment of the seat carrier and one of the metallic seal rings.
Figure 11:
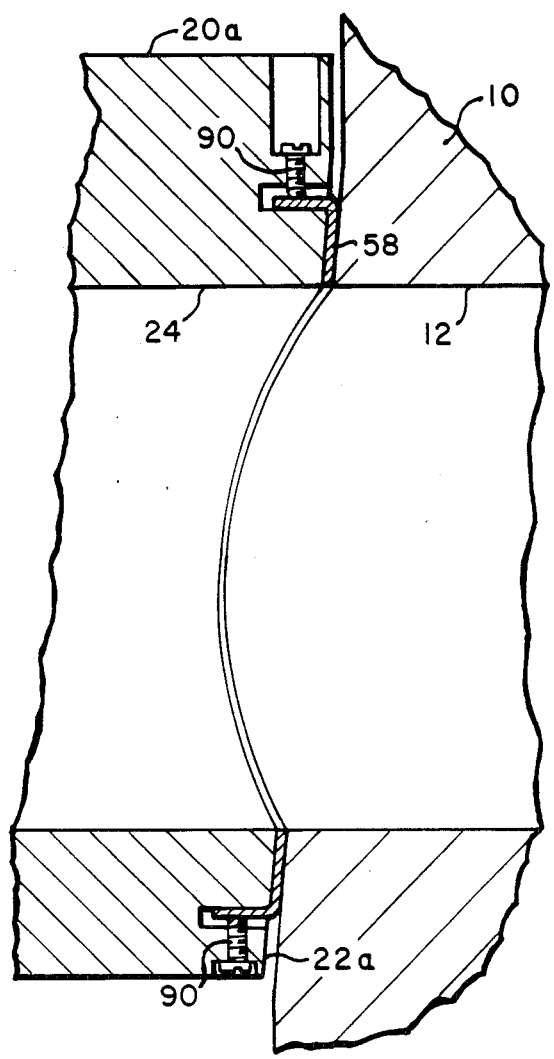
FIG. 11 is an enlarged fragmentary sectional view of the seat carrier of FIG. 10 with the carrier forced down into its operative position in the valve body and with the seal ring energized.

In the embodiment of FIGS. 10 and 11, a modified form of seat carrier is shown. Here the recess 60 of FIGS. 6 and 9 is eliminated and carrier 20a has a conical surface 22a against which seal ring 58 is pressed. Again, the seal ring is held in place by bending the ears 62 into recesses 64 provided in the seat carrier. If desired, the top and bottom ears may be engaged by set screws 90. The arrangement is such that with the seat carrier 20a forced down into position in the bore 16 and the seal ring 58 energized, the seat carrier is spaced from the valve body, i.e. conical surface 22a is spaced from surface 19.

It will be appreciated that the ears 62, in addition to securing ring 58 to seat carrier 20 and 20a so that the two are assembled and disassembled to and from the valve body as a unit, tend to prevent the ring from moving relative to the seat carrier as the latter is forced down into position in bore 16.

In FIGS. 12 and 13, there is disclosed a still further modified form of seat carrier. This embodiment is similar to that of FIG. 10 but provides a cylindrical internal member which acts as a stop to prevent the seal ring from moving out of position. In this embodiment, the seat carrier is identified as 20b and has the conical surface 22b similar to the conical surface in FIG. 10. The seal ring 58 is secured to the seat in the same manner as in the previously described embodiments. Seat carrier 20b is provided with a counter bore 92 at the ends of the passage 24 and received in this counter bore is the cylindrical stop member 94. The outer extremity of this top member conforms with the conical surface 22b of the seat carrier and extends slightly beyond this surface but less than the thickness of the seal ring 58 when the latter is in its energized sealing position within the valve body. As thus positioned, this cylindrical stop member will maintain the seal ring in position during insertion and withdrawal of the seat carrier into and from the valve body and during operation of the valve thereby preventing the seal ring 58 from being displaced and malfunctioning.

In the preferred embodiment depicted in FIG. 8a, the ring 58 has a rectangular configuration with relatively broad surfaces engaging the valve body and the seat carrier.

In the modified ring construction 58b, as shown in FIG. 8b, there is provided a slightly raised annular portion 66 directed toward the surface of the valve body when the ring is assembled into the seat carrier. This decreased area of contact with the valve body will provide a high stress area and thus a greater deformation at this location.

The ring may be provided with a plating of soft metallic material or tetra fluoro ethylene and very satisfactory results have been achieved by coating the surface with tin. This plating may be provided with either the configuration of FIG. 8a or FIG. 8b. FIG. 8c illustrates the ring 58c with such a coating. This FIG. 8c shows the tin coating 68 on the surface of the ring that engages the valve body. With this arrangement, satisfactory sealing has been obtained after assembling and disassembling a valve several times with the same seal ring being used. It will be understood that the plating material may be on both surfaces of the ring if necessary or desired. The plating may provide a lower coefficient of friction as well as enhance the sealing action.

FIG. 8d shows a still further embodiment of ring construction with this configuration having a self-energizing effect. The ring 58d is provided with annular raised portions 70 and 72 between which is formed an annular recess 74. When in the assembled position, this recess is directed radially outward and when the valve is in the closed position, the high pressure fluid that is being controlled will enter this recess thereby urging these portions of the ring toward the seat carrier and valve body, respectively, and thereby further deforms the same to further perfect the sealing action or seal ring energization.

Figure 14:
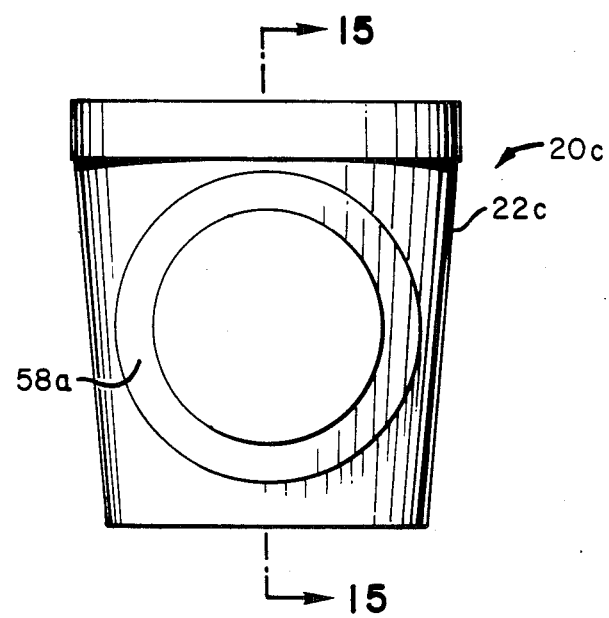
FIG. 14 is an elevational view of a further preferred embodiment of seat carrier where the seal ring is formed integral with the seat carrier.
Figure 15:
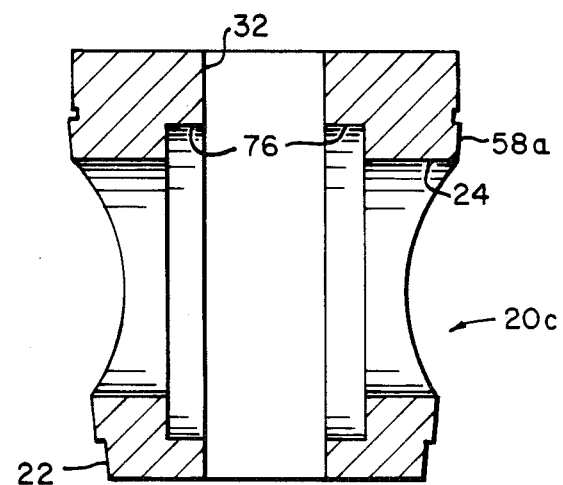
FIG. 15 is a sectional view taken from line 15—15 of FIG. 14.

In FIGS. 14 and 15, there is depicted still another embodiment of seat carrier wherein the seal ring or member is formed integral with the carrier. In this embodiment, the seat carrier is identified as 20c and it has a conical surface 22c in the same manner as the previously described embodiments. The seal ring or member identified as 58c is formed integral with the carrier. This may be done by first machining the surface 22c on the carrier and then by means of weld beads or clad welding forming the seal ring or member 58a with this being formed by first laying down the weld and then machining the outer surface thereof so as to conform with the conical configuration of surface 18 of the valve body 10. Alternatively to forming this seal ring or member 58a by means of welding, the seat carrier can be formed by precision casting in which case the surface 22c will not be machined at all but only the outer surface of the seal ring or member 58a will be machined to accurately conform to the taper of surface 18 of the valve body.

In this embodiment of FIGS. 14 and 15, the seal ring or member 58a will be provided with a suitable coating such as previously described and as, for example, tin, which is softer than the material of the valve body which will deform when the seat carrier is forced into place in the valve body and thus provides a seal between the seat carrier and the valve body.

Figure 7:
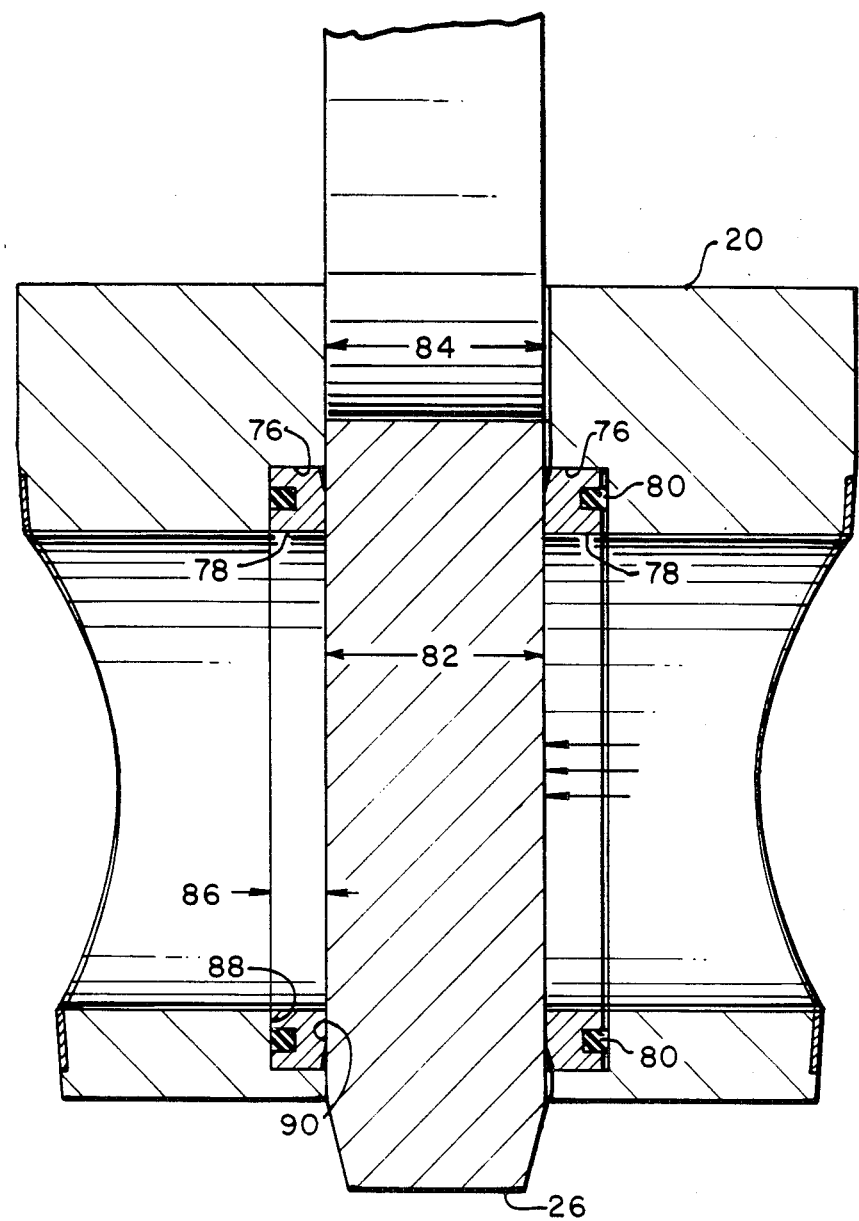
FIG. 7 is an enlarged section of the gate and the seat carrier with the gate in the closed position.

A metal-to-metal seal is also provided between the gate 26 and the seat carrier 20 and for this purpose, as best shown in FIG. 7, seat carrier 20 is provided with recesses or counterbores 76 about the entrances of the passages 24 into the recess 32 and within each of which is positioned an annular seat member 78. These seat members are resiliently biased toward and into engagement with the flat surfaces of gate 26 by the annular members 80 disposed in a suitable recess in the seat.

As previously mentioned, the gate 26 is loosely received within the recess 32. The thickness 82 of the gate is smaller than the width 84 of recess 32. Also, the axial dimension 86 of the seats 78 is greater than the corresponding dimension of groove 76. The result of this is that when the gate is moved to its closed position, the force of the fluid acting on the gate (represented by arrows in FIG. 7) will move the downstream seat 78 into its furtherest position downstream whereby it will abut the bottom of the recess or counterbore 76 and form a metal-to-metal seal while the engagement of the flat surface of gate 26 with the upstream surface of this seal 78 will likewise form a metal-to-metal seal. This is shown in FIG. 7 with a metal-to-metal seat being provided at the junctures 88 and 90.

In addition to resiliently biasing the seal 78 into engagement with the opposed flat surfaces of the gate 26, the annular members 80 may, where desired, be effective to form a low pressure seal between the seat and the seat carrier prior to the build-up of sufficient pressure to give the aforementioned metal-to-metal seal.

With the present invention, it will thus be understood that there is provided a valve of unitary construction which has a metal-to-metal seal between the seat carrier and the valve body as well as between the gate and the seat carrier.

I claim:

1. A gate valve having a valve body with a cavity open at one end and closed at the other end, a bonnet secured over and effectively closing said one end, a seat carrier contained within said cavity with said carrier and the cavity having complementary conically disposed walls, an aligned passageway extending through the body and the seat carrier and intersecting said conical walls, a gate carried by the seat carrier sealingly cooperating therewith, and movable between an open and a closed position with respect to said passageway, metallic seal means carried by the seat carrier and disposed about the opening at each end of the passageway in the seat carrier, said seal means being forced into sealing engagement with the conical wall of said cavity to form a metal-to-metal seal therewith upon forcing the seat carrier into position in said cavity while maintaining said conically disposed walls in spaced relation, said seat carrier being thus forced into position in response to the bonnet being secured over the open end of the cavity in said valve body, said bonnet, gate, seat carrier and seal means being effectively interconnected so that they are installed in and removed from the valve body as a unit.

2. The gate valve of claim 1 wherein said seat carrier is deformed within its elastic limit incident to being forced into position in the valve body to thus provide a resilient bias urging the seal member into its sealing engagement.

3. The gate valve of claim 1 wherein said valve body is deformed within its elastic limit incident to said seat carrier being forced into position in the valve body to thus provide a resilient bias urging the seal member into its sealing engagement.

4. The gate of claim 1 wherein said metallic seal means carried by said seat carrier comprises a metallic ridge projecting from the conical wall of the seat carrier and coated with metal that is softer than the metal of the valve body.

5. The gate valve of claim 1 wherein said metallic seal means carried by said seat carrier comprises a separate annular seal member secured to said carrier.

6. The gate valve of claim 5 wherein said seal member is coated with metal that is softer than the metal of the seat carrier and the valve body.

7. The gate valve of claim 5 including a cylindrical member received in a counter bore in the passageway ends in the seat carrier, said cylindrical member extending from the ends a distance less than the thickness of the annular seal means thereby remaining spaced from the conical wall of the valve body but maintaining the annular seal means in its proper position.

8. A gate valve having a gate movable between an open and a closed position, means for so moving said gate, a seat carrier having a recess receiving said gate and sealingly engaging the same when in the closed postion, a valve body within which said seat carrier is contained and having a through passage aligned with a through passage in said seat carrier, said body and seat carrier having complementary conical surfaces in the region of said through passages, and a relatively flat metallic seal ring disposed intermediate said seat carrier and said valve body at each end of the through passage in said seat carrier and about this passage and engaging said complementary conical surfaces, said ring being of a ductile metal that is softer than the material of the valve body and seat carrier, said seal rings maintaining said seat carrier and said valve body in spaced relation, means for forcing said seat carrier axially of said conical surfaces into position in said valve body and squeeze and deform the seal rings between the seat carrier and the valve body by so doing so that they provide a fluid tight seal therebetween, means for securing said seal rings to said seat carrier so they are carried thereby and means for causing removal of said seat carrier along with removal of said gate from said valve body.

9. The gate valve of claim 8 wherein said seal ring has a tin plating.

10. The gate valve of claim 8 wherein said seal ring has a plurality of radially extending ears, said seat carrier having bores complementary with said ears and receiving same in a manner to thereby secure said ring to said seat carrier.

11. The gate valve of claim 8 wherein said seal ring has an annular raised area of decreased radial dimension facing away from said seat carrier.

12. The gate valve of claim 8 wherein said seal ring has a radially outward facing relieved portion producing an annular recess.

13. The gate valve of claim 8 wherein at least one of said seat carrier and said valve body are deformed within their elastic limit incident to forcing said seat carrier into position in said valve body to thereby provide a resilient bias to squeeze said seal rings.

14. A gate valve having a valve body with a through passage and a bore transverse of and intersecting said through passage, said bore being open at one end and conical in the region of said passage, a bonnet fastener over the open end of said bore and when so fastened said bore being effectively closed at both ends, a seat carrier contained within said bore and positioned in said conical bore portion with a conical surface complementary with that of said bore, said seat carrier having a through passage in general alignment with the through passage in said body and a gate cavity transverse of and intersecting said passage, means for forcing said carrier into position in said bore incident to fastening the bonnet to said valve body, a gate in said cavity having flat sides facing the passages opening into said cavity, and having a passage obstructing and a passage unobstructing position, means for moving said gate to and from these positions, means for establishing a metal-to-metal seal between said gate and seat carrier when said gate is in its passage obstructing position, and means for establishing a metal-to-metal seal between the seat carrier and said valve body, the last named means including a metallic ring secured to said seat carrier and disposed about the outer ends of the through passage therein and generally coaxial thereof, said ring being generally flat and having a radial dimension considerably greater than its thickness, said ring being ductile and softer than the material of the seat carrier and body and being deformed when the seat carrier is forced into position to form a seal between the carrier and the body but maintaining said carrier and body in spaced relation.

15. The gate valve of claim 14 wherein a seat loading spacer is interposed between the bonnet and the seat carrier, the bonnet, the means for moving the gate, the gate and the loading spacer being interconnected for removal as a unit from the valve body.

16. The gate valve of claim 14 wherein said seat carrier when forced into position is deformed within its elastic limit so it acts to provide constant loading on the metallic rings.

17. The gate valve of claim 16 wherein said valve body is also deformed within its elastic limit when said seat carrier is forced into position to also act to provide constant loading on the metallic rings.

18. The gate valve of claim 14 wherein the seal ring is provided with radially extending projections, said projections being bent over into complementary recesses in the seat carrier to secure said ring to said carrier.

19. The gate valve of claim 14 wherein said seal ring has a plating of tin at least on the surface engaging the valve body.

20. The gate valve of claim 14 wherein said seal ring has an annular raised area of decreased radial dimension facing away from said seat carrier.

21. The gate valve of claim 14 wherein said seal ring has a radially outward facing relieved portion producing an annular recess.

22. The gate valve of claim 14 wherein the seal ring is plated with a material softer than the body of the ring.

23. The gate valve of claim 14 wherein the seal ring engages said complementary conical surfaces.

24. The gate valve of claim 14 wherein the seal ring is partially disposed in a recess of uniform depth in the seat carrier about the outer end of the through passage thereon.

25. The gate valve of claim 14 including cylindrical members extending from the passage ends in the seat carrier a distance less than the thickness of said rings to thereby inhibit movement of the rings into the passage.

26. In a gate valve of the type having a gate receiving seat carrier contained within a cavity in the valve body, which cavity intersects a through passage in the valve body and receives the line pressure when the valve is both open and closed, said carrier being forced into position upon assemblying the valve such that a passageway in said carrier is in alignment with said through passage, the improvement comprising forming said seat carrier with a conical surface that is complementary with a conical surface of said cavity in the region of the through passage, said carrier having a metallic annular seal member retained about each end of said passageway and forced into engagement with the conical surface of said valve body upon inserting said carrier in position, said annular seal members having sufficient thickness to maintain said conical surfaces in spaced relation when the carrier is forced into place and being of a material softer than that of said body, said carrier being stressed in compression and the valve body being stressed in tension, both within their elastic limits, incident to forcing said carrier into position in said cavity.

27. A valve having a valve body with a through flow passage and a cavity intersecting said passage, said cavity being effectively closed at one end and open at the other for insertion of a seat carrier, a seat carrier coaxial with and contained within said cavity and when in position in said cavity having a passageway aligned with said flow passage, said seat carrier and cavity having complementary conically disposed walls at the location of the intersection of said flow passage with said cavity, means for forcing said seat carrier into position in said cavity, generally flat metallic seal rings carrier by said seat carrier and disposed about each end of the passageway therein, said seal rings being squeezed between the seat carrier and the body wall incident to forcing the seat carrier in position, said seal rings being compressed beyond the elastic limit of the material thereof when the seat carrier is in place and having sufficient thickness so as to maintain said complementary conical walls in spaced relation, removable means sealing the other end of said cavity including a valve operator, and a valve member received in the seat carrier and movable between an open and a closed position, said valve member, valve operator, seat carrier and seal rings being removable from and insertable into the valve body as a unit.

* * * * *